Sept. 29, 1970         J. B. AMBROSE         3,531,366
SEAMING LACE ASSEMBLY FILLER AND METHOD OF FORMING SAME
Filed Dec. 12, 1967
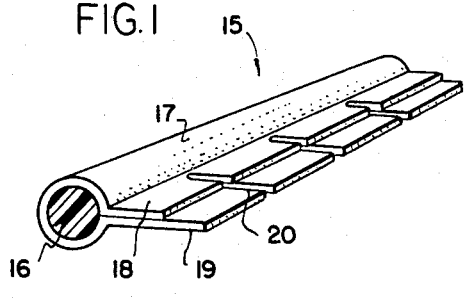
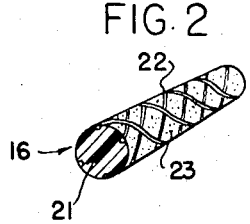
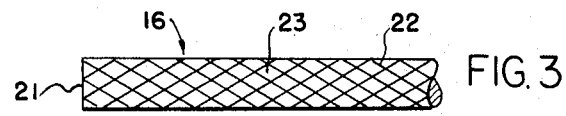
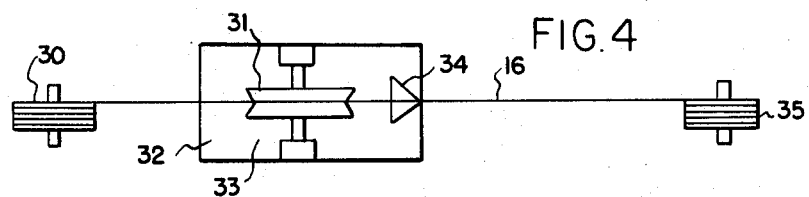
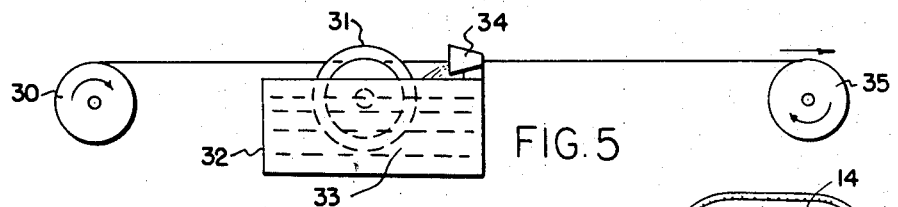
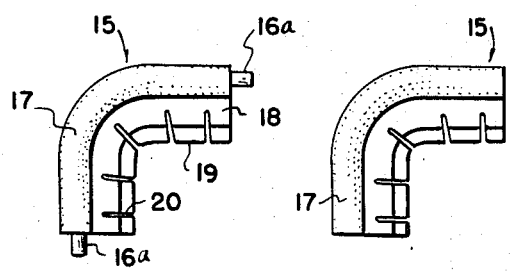
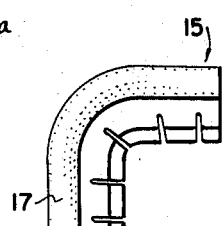
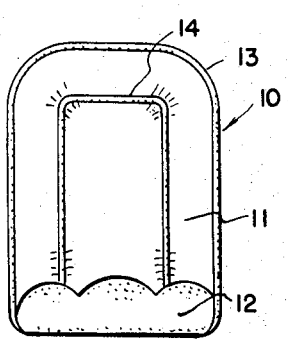
INVENTOR
JERE B. AMBROSE
BY Cullen, Sloman, & Cantor
ATTORNEYS ated Sept. 29, 1970

3,531,366
SEAMING LACE ASSEMBLY FILLER AND
METHOD OF FORMING SAME
Jere B. Ambrose, Birmingham, Mich., assignor to
Northern Fibre Products Company, Birmingham, Mich.
Filed Dec. 12, 1967, Ser. No. 689,837
Int. Cl. B32b 5/28, 27/12
U.S. Cl. 161—89                                                2 Claims

ABSTRACT OF THE DISCLOSURE

A seaming lace assembly filler used for forming upholstered furniture welted seams, composed of a core formed of a thin, flexible, thermoplastic rod having an open braided mesh surrounding the rod and formed of a higher melting point thread, and a hot application, permanently tacky adhesive covering the filled and thread, with the thread secured to the core by both heat bonding and adhesive bonding. The filler is made by mechanically braiding the thread about the core, then applying the adhesive to the braided core at a temperature sufficient to momentarily soften the surface of the core to thereby heat bond the thread to the core as well as adhesively bond the thread to the core.

Background of invention

This invention relates to a seaming lace assembly filler and method of forming same.

In the past, seaming lace assemblies have been formed of a filler made of either wire covered with paper or extruded plastic rod, with the filler surrounded by a cloth ribbon whose edges are secured together to form a continuous flap. Such assemblies are used to form the welted seams commonly found in upholstered furniture such as upholstered seats used in homes as well as in upholstered seats used in automobiles and the like.

The welted seam is made by either surrounding or by stitching to the assembly the upholstery fabric, thereby forming the conventional welted seam along edges and at various points in upholstered furniture.

In the case of automotive seats, particularly the so-called "bucket" seats, welted seams are used frequently along the backs of the seats, but spaced from the edges. In such applications, the constant movement of the welted seam, caused by movement of the occupant of the seat as well as movements caused by the occupant sitting upon and rising from the seat, results in the filler slipping relative to its surrounding ribbon, particularly where the welted seam curves so that the fillers tend to extend beyond the ends of the ribbon causing puckering of the ribbon and of the seam which frequently remains even after the seat is no longer occupied.

In the past, various attempts have been made to reduce or eliminate the movement of the filler, particularly endwise out of its protective or covering ribbon which forms the asesmbly, but these have been successful, particularly in that any convention available means for reducing this slippage has resulted in considerably higher costs, making the assembly no longer economical to use.

Summary of invention

It is an object of this invention to provide a relatively inexpensive filler which will not slip endwise within the ribbon, which forms the seaming lace assembly, despite continuous and repeated flexing and movement of the welted seam formed of the assembly.

A further object of this invention is to form a filler made of a thermoplastic core surrounded by a braided open mesh formed of thin threads, with the threads bonded to the core both by heat as well as by adhesive which remains permanently tacky, and with the adhesive, being of a hot application type, functioning to provide the heat bonding as well as adhesive bonding. Thus the completed filler comprises a surface which is considerably roughened by the open mesh and which is permanently tacky, as well, thereby, for all practical purposes, eliminating the objectional slippage or endwise movement of the filler within the assembly.

These and other objects and advantages of this invention will become apparent upon reading the following description, of which the attached drawings form a part.

Description of drawings

In the drawings:

FIG. 1 is a perspective view of a typical seaming lace assembly.

FIG. 2 is a perspective view of a short length of the improved filler of this invention.

FIG. 3 is an elevational view of the filler.

FIG. 4 is a schematic, plan view illustrating the application of the adhesive to the filler core, and FIG. 5 is an elevational, schematic view of the apparatus and steps shown in FIG. 4.

FIG. 6 illustrates a bent section of a conventional or prior art filler assembly and illustrates the slippage of the filler therein.

FIG. 7 is a view similar to FIG. 6, but showing the assembly of this invention.

FIG. 8 is a front elevational view of a typical automotive "bucket" type seat showing welted seams.

Detailed description

Referring first to FIG. 8, which is illustrative of the use of welted seams in upholstered furniture, and particularly in automotive types of seats, a typical so-called "bucket" seat 10 is illustrated. The seat has a back 11, seat portion 12 with welted seams 13 and 14 formed on the outer edge and at a distance spaced inwardly of the outer edge, respectively of the seat back.

The welted seams are formed by first providing a seaming lace assembly to which the upholstery fabric is fastened, in the conventional manner.

FIG. 1 illustrates, in perspective, a short section of a typical seaming lace assembly 15 which comprises a filler 16 surrounded by a covering ribbon 17 whose free edges are formed into overlapping edge flaps 18 and 19 which are secured together in any conventional manner. The flaps are provided with spaced apart slits 20 so that the assembly may be easily bent and flexed. The ribbon may be formed of any conventional suitable material, such as vinyl covered cloth, or merely plain cloth, etc.

In the past, the filler was generally formed of either metal wire surrounded by a paper covering or of a thin, flexible plastic rod. These, being slippery would slip endwise relative to the assembly, as illustrated in FIG. 6 wherein a prior art assembly is shown in a bended condition, illustrating the endwise movement of the conventional filler, generally designated as 16a, so that it extends outwardly from the opposite ends of the assembly, causing puckering of the fabric sewn to the assembly.

The improved filler of the invention, comprises a core 21 which is formed of a suitable thermoplastic, flexible, thin, plastic rod, as for example, polyethylene plastic of approximately ⅛ of an inch in diameter or less. The core is covered with a braided, open mesh 22 formed of thin threads, as for example, a diameter of .005 to .010 inch in diameter. These threads may be formed of any suitable material, but preferably of a plastic, such as rayon which has a melting point which is considerably higher than the melting point of the core material.

The mesh covered core is coated with an adhesive 23 which is characterized by being of the hot application type and which remains permanently tacky upon cooling. In addition, the adhesive is characterized by being applicable at a temperature which is sufficient to momentarily or temporarily soften the outer surface of the thermoplastic core, so that the application of the adhesive simultaneously causes the threads of the mesh to heat bond to the core as well as being adhesively bonded thereto.

The method of forming the filler begins with the first step of braiding an open mesh upon previously extruded core rod in a conventional braiding machine. At this point, the threads are held upon the core only by a small amount of friction and can be easily slid or moved endwise out of position. This is particularly true because the typical plastic materials used here are slippery.

The conventional braiding machines provide means for coiling the braided core following the braided operation.

At this point, referring to FIGS. 4 and 5, the coil of braided core 30 is then uncoiled and run through an adhesive applicator in the form of a wheel 31 to receive the braid covered core. Such wheel may be located within a heated tank 32 containing the heated adhesive 33 which is maintained at a temperature sufficiently high to soften the core. The wheel 31 rotates due to the movement of the core upon its peripheral edge so that it constantly picks up adhesives and deposits the adhesive upon the core.

The core then passes through a funnel-shaped scraper 34 which uniformly distributes the adhesive and drops back into the tank the excess. Thereafter, the adhesive coated material is air-cooled until it is recoiled to form a new coil 35.

Thereafter the ribbon 17 is applied to the filler in the conventional manner to form the complete seaming lace assembly.

The wheel 31, with its adhesive, momentarily softens the surface of the thermoplastic core, so that when the core cools, the threads of the mesh are heat bonded to the core in addition to being bonded thereto by adhesives. In this manner, the mesh forms an integral part of the core to provide it with a uniformly roughened surface, in turn coated by the permanently tacky adhesive.

As illustrated in FIG. 7, particularly when compared with FIG. 6, the seaming lace assembly made with the improved filler herein, may now be easily bent and flexed as in the case of the prior art assemblies but with the difference that the filler will no longer move endwise and will maintain its position within the ribbon without slippage and thereby preventing the puckering of upholstery fabric secured to the assembly.

This invention may be further developed within the scope of the following claims. Accordingly, it is desired that the foregoing description be read as being merely illustrative of an operative embodiment of this invention and not in a strictly limited sense.

Having fully described an operative embodiment of this invention, I now claim:

1. A seaming lace assembly filler comprising:
   a core formed of a thin, relatively smooth, flexible, thermoplastic rod;
   with said rod being smooth and hard at room temperature, but of a material which softens slightly at elevated temperatures and which returns to smooth and hard condition when cooled back to room temperature;
   a braided open mesh surrounding the core along its full length and formed of a thread having a melting point considerably higher than that of the core;
   a hot application, permanently tacky adhesive surrounding the mesh covered core;
   and said threads being heat bonded to the core by adhesiveness of said thermoplastic rod as well as bonded thereto by a separately applied adhesive, and forming a roughened surface upon the completed filler.

2. A method of forming a seaming lace assembly filler, said filler comprising a core formed of a thin, relatively smooth, thermoplastic, flexible rod, closely surrounded along its full length by a braided open mesh, formed of a thread, with the mesh covered core being coated with a hot application, permanently tacky adhesive, characterized by being applied at a temperature sufficiently high to momentarily soften the surface of the core, comprising the steps of:
   first, braiding the thread around the core to form the open mesh covering thereon;
   next, coating the mesh covered core with the adhesive at a temperature sufficiently high to momentarily soften the surface of the core;
   thereafter, cooling the coated mesh covered core to complete the heat bonding of the thread directly to the core at their places of surface contact, while at the same time completing the adhesive bonding of the threads to the core.

References Cited

UNITED STATES PATENTS

| | | | |
|---|---|---|---|
| 2,142,039 | 12/1938 | Abrams et al. | 161—406 |
| 2,228,368 | 1/1941 | Schlegel et al. | 161—101 XR |
| 2,574,124 | 11/1954 | Schlegel | 161—101 XR |

JOHN T. GOOLKASIAN, Primary Examiner

W. E. HOAG, Assistant Examiner

U.S. Cl. X.R.

156—148, 278, 306; 161—101, 164, 166, 167, 175